Oct. 18, 1949.  A. E. JACOBS  2,484,949
THRESHED GRAIN BUNCHER
Filed Aug. 16, 1948  2 Sheets-Sheet 2
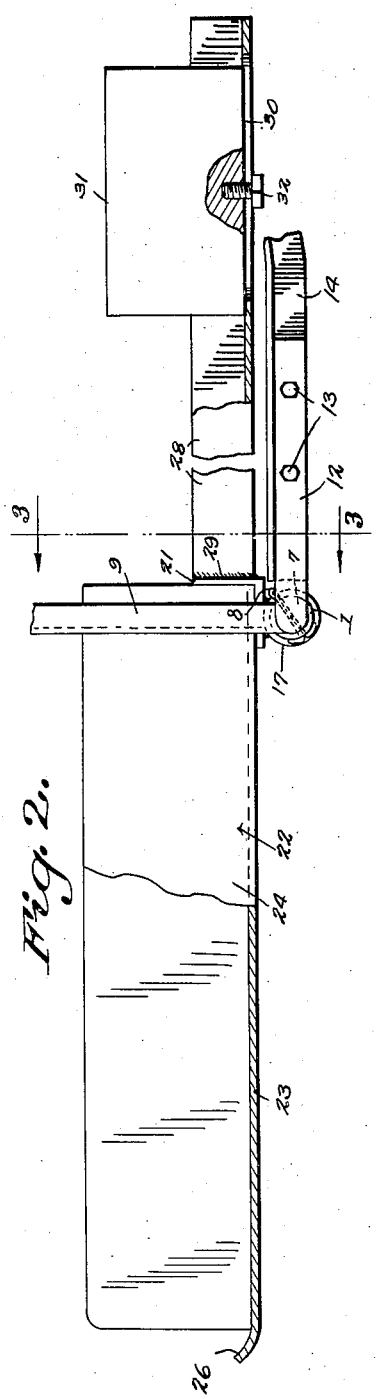
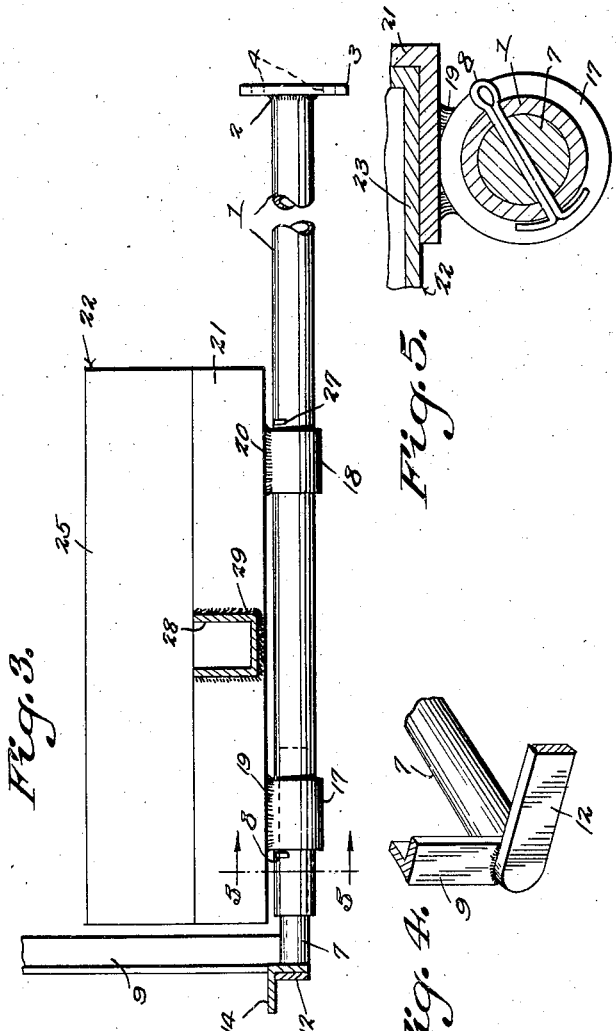
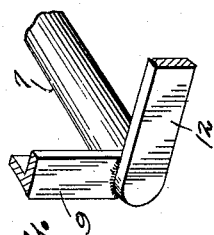
A.E. Jacobs
INVENTOR
BY
ATTORNEYS.

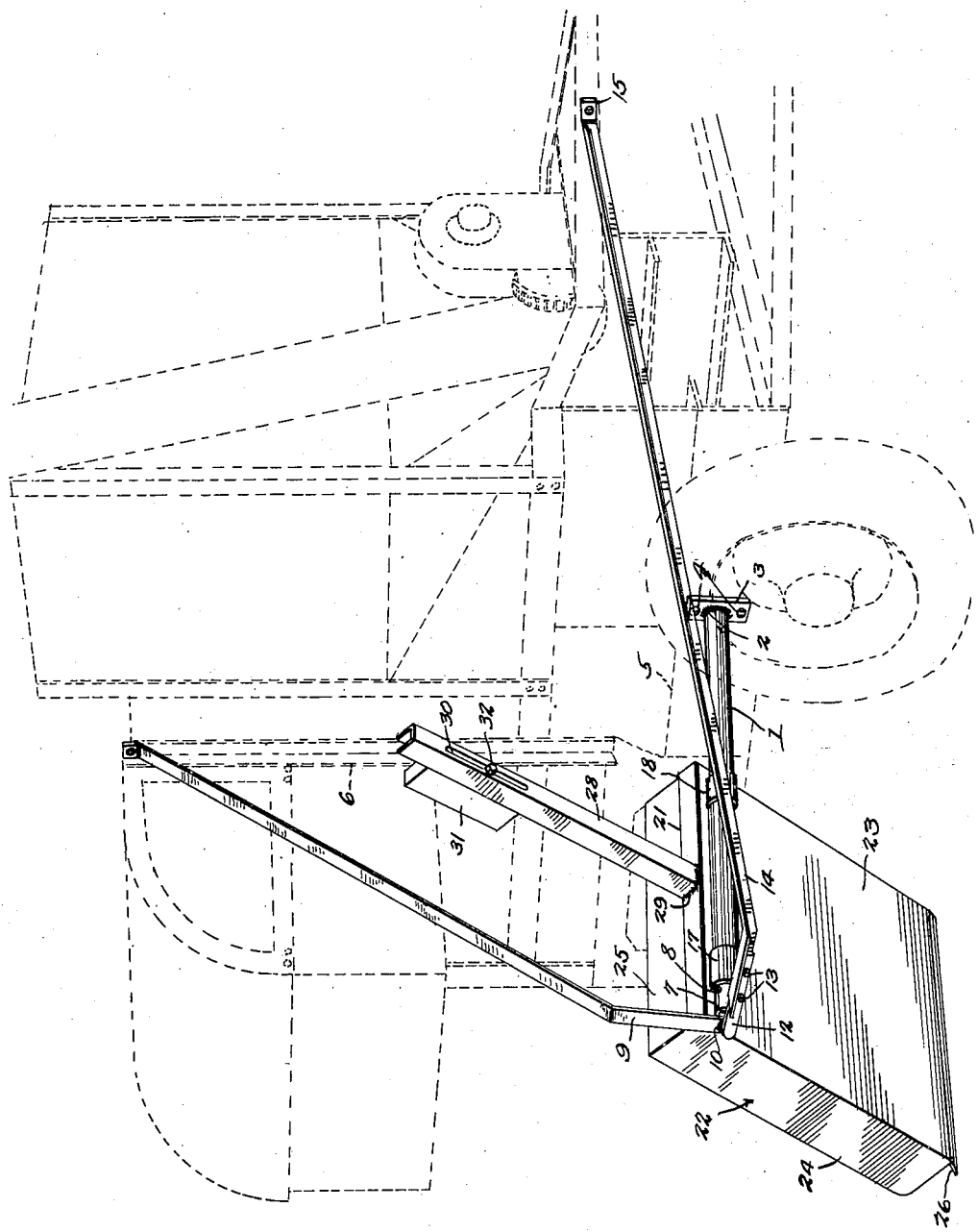

Patented Oct. 18, 1949

2,484,949

UNITED STATES PATENT OFFICE 2,484,949

THRESHED GRAIN BUNCHER

Arthur E. Jacobs, Kiowa, Kans.

Application August 16, 1948, Serial No. 44,520

4 Claims. (Cl. 298—17)

1

This invention relates to improvements in threshed grain bunchers.

An object of the invention is to provide an improved threshed grain buncher which will be attached to the side of a harvester for bunching threshed straw or alfalfa as it comes from the separator of the harvester.

Another object of the invention is to provide an improved automatically dumping threshed grain buncher attachment for a harvester which will be normally held in horizontal or parallel relation to the ground by means of a weight attached to a weight arm supported by the pivotally supported buncher hopper, whereby when threshed grain or alfalfa is deposited in the hopper from the separator of the harvester in sufficient quantity to overbalance the weight, the hopper will pivot downwardly to unload the bunched threshed grain or alfalfa and will automatically be brought back into horizontal or loading position by means of the counterbalancing weight.

A further object of the invention is to provide an adjustable counterbalanced or weighted threshed grain or alfalfa bunching hopper attachment for a harvester which will be highly efficient in operation and relatively inexpensive to manufacture and produce.

Other objects will appear as the description proceeds.

In the accompanying drawings which form a part of this application:

Figure 1 is a perspective view of the improved threshed grain buncher attachment shown in dumping position, the same being mounted upon a harvester which is shown in broken lines.

Fig. 2 is a side elevation of the improved threshed grain buncher attachment with the hopper thereof being partly broken away and in section.

Fig. 3 is a sectional view taken on the line 3—3 of Fig. 2.

Fig. 4 is a detail view of the outer end of the hopper supporting slip shaft or axle.

Fig. 5 is a sectional view taken on the line 5—5 of Fig. 3.

Like characters of reference are used throughout the following specification and the accompanying drawings to designate corresponding parts.

In carrying out the invention there is shown and provided an improved form and construction of automatically dumping threshed grain buncher attachment for a harvester including an elongated tubular supporting axle 1, which is welded at 2 to an attaching bracket or plate 3, through which openings 4 will be formed for receiving bolts (not shown) for securing the bracket or plate 3 to the harvester frame 5 under the tailing elevator 6.

A solid slip axle or shaft 7 will be slidably received in the outer end of the elongated tubular supporting axle 1, and will be secured in place by the cotter key 8 extending through both axles 1 and 7.

An upwardly and inwardly extending angle iron brace 9 will be welded at 10 to the outer end of the solid slip axle or shaft 7, and will be attached at its upper end to the harvester frame 5 by means of the bolt (not shown).

A rearwardly extending stub arm 12 will also be welded as at 10 to the outer end of the slip axle or shaft 7, and will be formed with openings (not shown) for receiving the two bolts 13 extending through openings (not shown) in the angle iron brace 14 whose inner end is angled to form an apertured ear 15 through which a bolt (not shown) passes, for bolting the brace 14 to the harvester frame 5, thus securely supporting the cooperating axles 1 and 7.

Transversely spaced collars 17 and 18 are rotatably mounted upon the elongated tubular supporting axle 1 and are welded at 19 and 20 to the heavy angle iron end member 21 upon which the substantially rectangular bunching hopper 22 is fixed. The opposite end of the hopper 22 from the end member 21 is open, and the hopper 22 is formed by a bottom 23, opposite sides 24, and an end 25. An upturned or angled lip 26 is formed along the edge of the bottom 23 at the open end of the hopper 22.

The cotter key 8 and a cotter key 27 extending through the axle 1 will hold the hopper 22 from endwise movement on the axle 1 as it pivots upon it while unloading and returning to loading position.

A U-shape weight supporting arm 28 is welded at 29 to the heavy angle iron end member 21 extending in an opposite direction to the hopper 22, and is formed with an elongated slot 30 adjacent its outer end.

A heavy weight 31 is supported in the U-shape arm 28 by means of the bolt 32 which is adjustably disposed through the slot 30 and secured in the desired adjustment by tightening the bolt 32.

In operation, as the harvester frame is pulled over a field, the threshed straw or hay will be fed from the tailing elevator into the hopper 22, and when the hopper 22 is filled sufficiently to overbalance the counterweight 31, it will tilt downwardly depositing the bunched straw or hay in a pile on the ground and immediately move upward to a horizontal position for refilling, due to the counterbalancing weight 31.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A grain buncher attachment for a harvester comprising a laterally extending fixed tubular axle, a stub axle detachably supported in the outer end of said fixed axle, reinforcing braces attached to the outer end of said stub axle adapted to be fixed to a harvester, transversly spaced bearing collars on said fixed axle, a supporting angle iron end member welded to said collar, a hopper supported by said end member, a weight supporting arm secured to said hopper extending in an opposite direction therefrom, and a weight adjustably supported upon the outer end of said arm.

2. A grain buncher attachment for a harvester comprising a laterally extending fixed tubular axle, a stub axle detachably supported in the outer end of said fixed axle, reinforcing braces attached to the outer end of said stub axle adapted to be fixed to a harvester, transversely spaced bearing collars on said fixed axle, a supporting angle iron and member welded to said collar, a hopper supported by said end member, a U-shape weight supporting arm secured to said end member in opposed relation to said hopper, said arm being longitudinally slotted adjacent its outer end, and a weight supported by said arm having a securing bolt adjustably disposed through said slot.

3. The subject matter as claimed in claim 2, and means for preventing transverse movement of said hopper on its supporting axle.

4. The subject matter as claimed in claim 2, means for preventing transverse movement of said hopper on its supporting axle, and an upturned lip formed along the discharge end of the bottom of said hopper.

ARTHUR E. JACOBS.

REFERENCES CITED

The following references are of record in the file of this patent:

UNITED STATES PATENTS

| Number | Name | Date |
|---|---|---|
| 829,301 | Storck | Aug. 31, 1906 |
| 1,844,344 | Breeden | Feb. 9, 1932 |
| 2,008,561 | Rodgers et al. | July 16, 1935 |
| 2,327,264 | Hendrickson | Aug. 17, 1943 |
| 2,391,412 | Gorton | Dec. 25, 1945 |